US009816639B2

United States Patent
Suzuki et al.

(10) Patent No.: US 9,816,639 B2
(45) Date of Patent: Nov. 14, 2017

(54) EXPANSION VALVE DEVICE

(75) Inventors: Yuuya Suzuki, Nagoya (JP); Tatsuhiro Matsuki, Obu (JP); Kazuaki Takemoto, Kariya (JP)

(73) Assignee: DENSO CORPORATION, Kariya, Aichi-pref. (JP)

(*) Notice: Subject to any disclaimer, the term of this patent is extended or adjusted under 35 U.S.C. 154(b) by 430 days.

(21) Appl. No.: 14/238,614

(22) PCT Filed: Aug. 9, 2012

(86) PCT No.: PCT/JP2012/005075
§ 371 (c)(1),
(2), (4) Date: Feb. 12, 2014

(87) PCT Pub. No.: WO2013/042303
PCT Pub. Date: Mar. 28, 2013

(65) Prior Publication Data
US 2014/0245778 A1 Sep. 4, 2014

(30) Foreign Application Priority Data
Sep. 24, 2011 (JP) ................................ 2011-208295

(51) Int. Cl.
F16K 31/04 (2006.01)
F25B 41/06 (2006.01)
B60H 1/32 (2006.01)

(52) U.S. Cl.
CPC .......... *F16K 31/047* (2013.01); *B60H 1/3213* (2013.01); *F25B 41/062* (2013.01); *F25B 2341/0653* (2013.01); *Y02B 30/72* (2013.01)

(58) Field of Classification Search
CPC ...... F16K 31/04; F16K 31/041; F16K 31/042; F16K 31/045; F16K 31/046;
(Continued)

(56) References Cited

U.S. PATENT DOCUMENTS 4,593,881 A 6/1986 Yoshino
4,620,424 A * 11/1986 Tanaka ................. F25B 41/062
62/222
(Continued)

FOREIGN PATENT DOCUMENTS

CN 2145285 11/1993
JP H4-27470 B2 5/1992
(Continued)

OTHER PUBLICATIONS

Office Action dated Feb. 26, 2015 in the corresponding CN application No. 201280040408.0.
(Continued)

*Primary Examiner* — Kun Kai Ma
(74) *Attorney, Agent, or Firm* — Harness, Dickey & Pierce, P.L.C.

(57) ABSTRACT

A drive control device performs a mode change with a constant current between a first mode in which an opening degree of a refrigerant passage is changed in a first flow region where a flow rate of refrigerant flowing through the refrigerant passage is lower than or equal to a predetermined value and a second mode in which the opening degree of the refrigerant passage is changed in a second flow region where the flow rate of refrigerant flowing through the refrigerant passage is higher than the predetermined value. The drive control device increases a value of the constant current at the mode change to be larger than a value of a constant current when the opening degree of the refrigerant passage is changed in the first mode.

5 Claims, 5 Drawing Sheets

(58) Field of Classification Search
CPC .... F16K 31/047; F16K 31/048; F25B 41/062;
F25B 2341/0653; Y02B 30/72
See application file for complete search history.

(56) References Cited

U.S. PATENT DOCUMENTS

| | | | | |
|---|---|---|---|---|
| 4,674,292 A * | 6/1987 | Ohya | ............... | F25B 41/062 |
| | | | | 62/223 |
| 4,745,767 A * | 5/1988 | Ohya | ............... | F25B 41/062 |
| | | | | 62/211 |
| 5,469,746 A * | 11/1995 | Fukunaga | ............... | G01F 1/60 |
| | | | | 73/861.12 |
| 5,885,062 A | 3/1999 | Inoue et al. | | |
| 6,073,459 A * | 6/2000 | Iritani | ............... | B60H 1/3205 |
| | | | | 62/204 |
| 2004/0079096 A1 | 4/2004 | Itoh et al. | | |
| 2004/0159809 A1* | 8/2004 | Noritake | ............... | F16K 31/046 |
| | | | | 251/129.04 |
| 2005/0121986 A1* | 6/2005 | Matsuki | ............... | H05K 1/0203 |
| | | | | 310/64 |
| 2006/0043325 A1* | 3/2006 | Umezawa | ............... | F16K 31/047 |
| | | | | 251/129.11 |
| 2006/0180780 A1* | 8/2006 | Arai | ............... | F16K 31/04 |
| | | | | 251/129.11 |
| 2007/0084238 A1* | 4/2007 | Son | ............... | F16K 11/074 |
| | | | | 62/527 |
| 2008/0067464 A1* | 3/2008 | Arai | ............... | F16K 31/04 |
| | | | | 251/319 |
| 2010/0314566 A1* | 12/2010 | Huerta-Ochoa | ............... | F16K 3/0209 |
| | | | | 251/129.11 |
| 2012/0091375 A1* | 4/2012 | Suganuma | ............... | F16K 1/52 |
| | | | | 251/129.01 |
| 2012/0187202 A1 | 7/2012 | Suzuki et al. | | |
| 2012/0211683 A1* | 8/2012 | Uchida | ............... | F16K 17/0406 |
| | | | | 251/129.01 |
| 2013/0340860 A1* | 12/2013 | Ogawa | ............... | G05D 7/0617 |
| | | | | 137/487.5 |

FOREIGN PATENT DOCUMENTS

| | | |
|---|---|---|
| JP | H10-2434 A | 1/1998 |
| JP | 2001-041337 | 2/2001 |
| JP | 2001-153236 A | 6/2001 |
| JP | 2004-142646 A | 5/2004 |
| JP | 2006-226369 A | 8/2006 |
| JP | 2006-266634 A | 10/2006 |
| JP | S62-209279 A | 10/2006 |
| JP | 2008-101765 A | 5/2008 |

OTHER PUBLICATIONS

International Search Report and Written Opinion of the ISA for PCT/JP2012/005075, ISA/JP, mailed Sep. 11, 2012.

* cited by examiner

EXPANSION VALVE DEVICE

CROSS REFERENCE TO RELATED APPLICATION

This disclosure is a U.S. National Phase application under 35 U.S.C. §371 of International Application No. PCT/JP 2012/005075, filed Aug. 9, 2012, based on Japanese Patent Application No. 2011-208295 filed on Sep. 24, 2011, the disclosures of which are incorporated herein by reference in their entirety.

TECHNICAL FIELD

The present disclosure relates to an expansion valve device.

Patent document 1 describes an electric valve (electric expansion valve) used for controlling a flow rate of refrigerant. The electric valve has a valve member that opens or closes a valve port of a fluid passage using a stepping motor. The electric valve has a reduction gear, and the rotation output of the rotor of the stepping motor is transmitted to a screw mechanism which moves the valve member through the reduction gear. Thereby, powerful valve-controlling force and high-resolution valve opening characteristic are acquired.

It is possible to secure high output and high flow rate control accuracy with the electric expansion valve from a small flow rate control region to a large flow rate control region. However, for example, when the valve opening is changed from the small flow rate control region to the large flow rate control region or when the valve opening is changed from the large flow rate control region to the small flow rate control region, it takes time to move the valve member. That is, when a mode is switched between a mode where the valve opening is changed within the small flow rate control region and a mode where the valve opening is changed within the large flow rate control region, it takes long time to reach a valve opening to be set.

PRIOR ART DOCUMENT

Patent document

Patent document 1: JP-2006-226369A

SUMMARY OF THE INVENTION

It is an object of the present disclosure to provide an expansion valve device by which it is possible to shorten a time period taken for reaching a target valve opening degree in case where a mode change is performed between a mode in which the valve opening degree is changed within a small flow rate control region and a mode in which the valve opening degree is changed within a large flow rate control region.

According to an example of the present disclosure, an expansion valve device arranged in a refrigerating cycle to decompress and expand refrigerant circulating through the refrigerating cycle includes a housing, a valve member, an electric driver, and a drive control device. The housing defines a refrigerant passage through which the refrigerant circulates. The valve member is arranged in the housing so as to change an opening degree of the refrigerant passage. The electric driver has a stepping motor so as to control the opening degree of the refrigerant passage by displacing the valve member in accordance with a rotation angle of the stepping motor. The drive control device drives and controls the stepping motor with a constant current. The drive control device performs a mode change with a constant current between a first mode in which the opening degree of the refrigerant passage is changed in a first flow region where a flow rate of refrigerant flowing through the refrigerant passage is lower than or equal to a predetermined value and a second mode in which the opening degree of the refrigerant passage is changed in a second flow region where the flow rate of refrigerant flowing through the refrigerant passage is higher than the predetermined value, and increases a value of the constant current of the mode change to be larger than a value of a constant current used when the opening degree of the refrigerant passage is changed in the first mode.

Accordingly, the drive control device can stably drive the stepping motor with the constant current even when a voltage supplied from a power source is varied. Furthermore, when the mode change is performed between the first mode in which the opening degree of the refrigerant passage is changed in the first flow region where the flow rate of refrigerant flowing through the refrigerant passage is lower than or equal to the predetermined value and the second mode in which the opening degree of the refrigerant passage is changed in the second flow region where the flow rate of refrigerant flowing through the refrigerant passage is higher than the predetermined value, the current value of the constant current drive is increased to be larger than that used when the opening degree of the refrigerant passage is changed in the first mode. Thereby, the torque generated by the stepping motor is increased to displace the valve member, so the valve opening degree can be quickly changed.

Therefore, when the mode change is performed between a mode where the opening degree of the refrigerant passage is changed in a small flow rate control region and a mode where the opening degree of the refrigerant passage is changed in a large flow rate control region, time taken for reaching the set valve opening degree can be shortened.

Further, for example, the drive control device has a deceleration mechanism which slows down rotation of the stepping motor, and the valve member is displaced by the rotation of the stepping motor through the deceleration mechanism. The expansion valve device equipped with the deceleration mechanism which slows down rotation of the stepping motor can achieve high flow control accuracy, but it takes much time to move the valve member at the time of changing the valve opening degree. Therefore, it is very effective to apply the present disclosure to the expansion valve device equipped with the deceleration mechanism.

Further, for example, the drive control device forbids increase in the current value even at the time of mode change, when a temperature of the drive control device is higher than a predetermined value, or when a value of physical quantity related to the temperature is higher than a predetermined threshold value.

If the temperature becomes high, the function of the drive control device may fall. Therefore, when the temperature of component part of the drive control device is over the predetermined value, or when the value of the physical quantity related to the temperature is higher than the predetermined threshold value, the current value is prohibited from increasing even at the mode change time, thereby restricting the temperature of the drive control device from increasing. Thus, the drive control device can be restricted from having the function error.

Further, for example, the first mode is a decompression expansion mode where the refrigerant is decompressed and expanded in the first flow region when it is necessary to decompress the refrigerant flowing through the refrigerant passage, and the second mode is a full open mode where the valve member makes the opening degree of the refrigerant passage to be maximum such that the flow rate of the refrigerant flowing through the refrigerant passage becomes maximum in the second flow region when it is not necessary to decompress the refrigerant flowing through the refrigerant passage.

Accordingly, at the time of decompression expansion mode in which the refrigerant is decompressed and expanded in the small flow rate region where the flow rate of refrigerant flowing through the refrigerant passage is lower than or equal to the predetermined value, the refrigerant flow rate is controlled by displacing the valve member with comparatively sufficient accuracy. Further, when a mode change is performed between the decompression expansion mode and the full open mode in which the opening degree of the refrigerant passage is made the maximum by the valve member, the mode change can be quickly performed.

Further, for example, the first mode is a first decompression expansion mode where the refrigerant is decompressed and expanded in the first flow region, and the second mode is a second decompression expansion mode where the refrigerant is decompressed and expanded in the second flow region, and the drive control device increases the value of the constant current at the time of mode change to be larger than both of a value of constant current used when the opening degree is changed in the first mode and a value of constant current used when the opening degree is changed in the second mode.

Accordingly, at the time of decompression expansion mode in which the refrigerant is decompressed and expanded in the small flow rate region where the flow rate of refrigerant flowing through the refrigerant passage is lower than or equal to the predetermined value and at the time of decompression expansion mode in which the refrigerant is decompressed and expanded in the large flow rate region where the flow rate of refrigerant flowing through the refrigerant passage exceeds the predetermined value, the refrigerant flow rate is controlled by displacing the valve member with comparatively sufficient accuracy. Further, when a mode change is performed between the decompression expansion mode within the small flow rate region and the decompression expansion mode within the large flow rate region, the mode change can be quickly performed.

EMBODIMENT TO PRACTICE THE INVENTION

Figure 1:
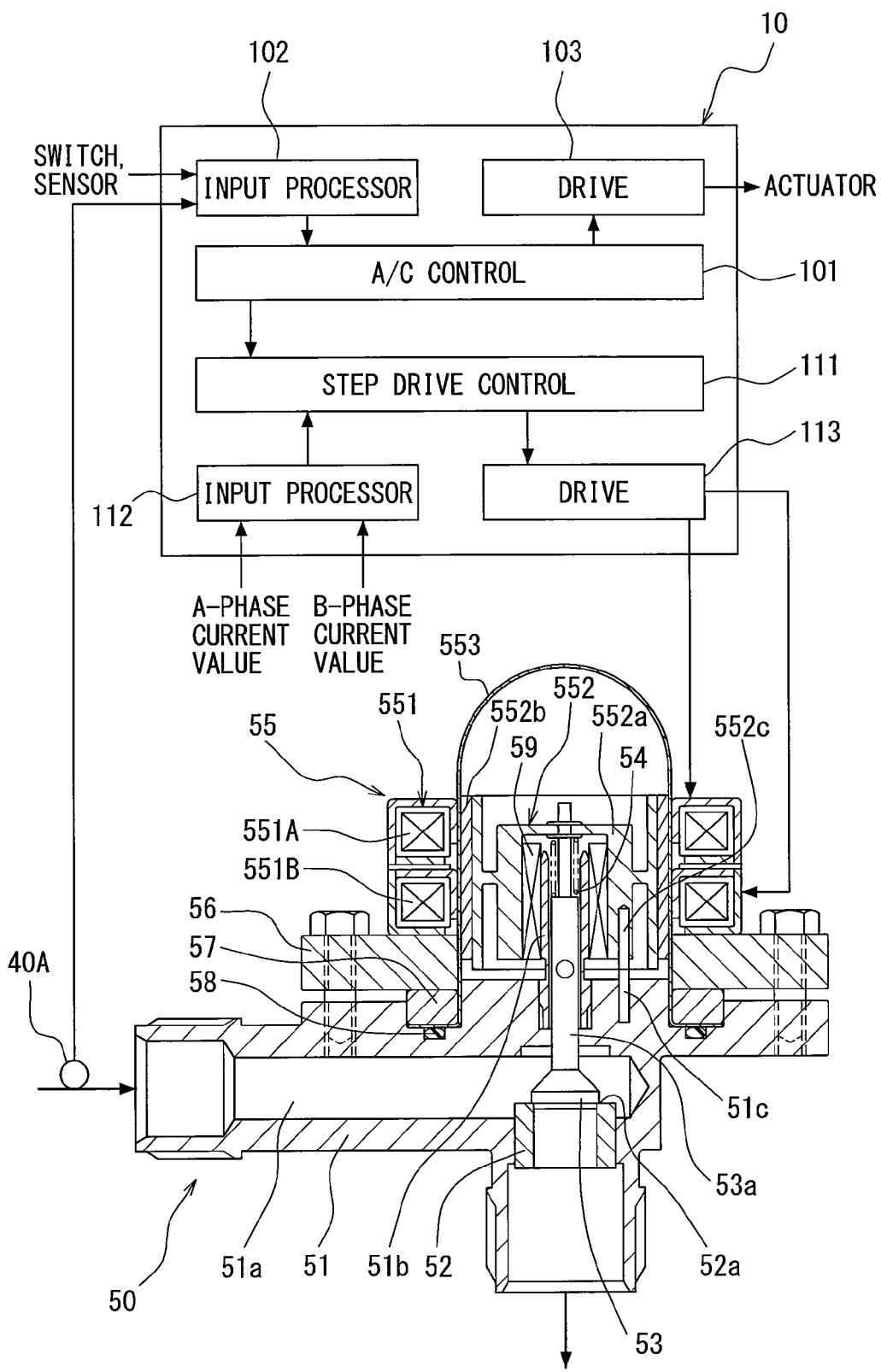
FIG. 1 is a schematic view illustrating an expansion valve device according to an embodiment.
Figure 2:
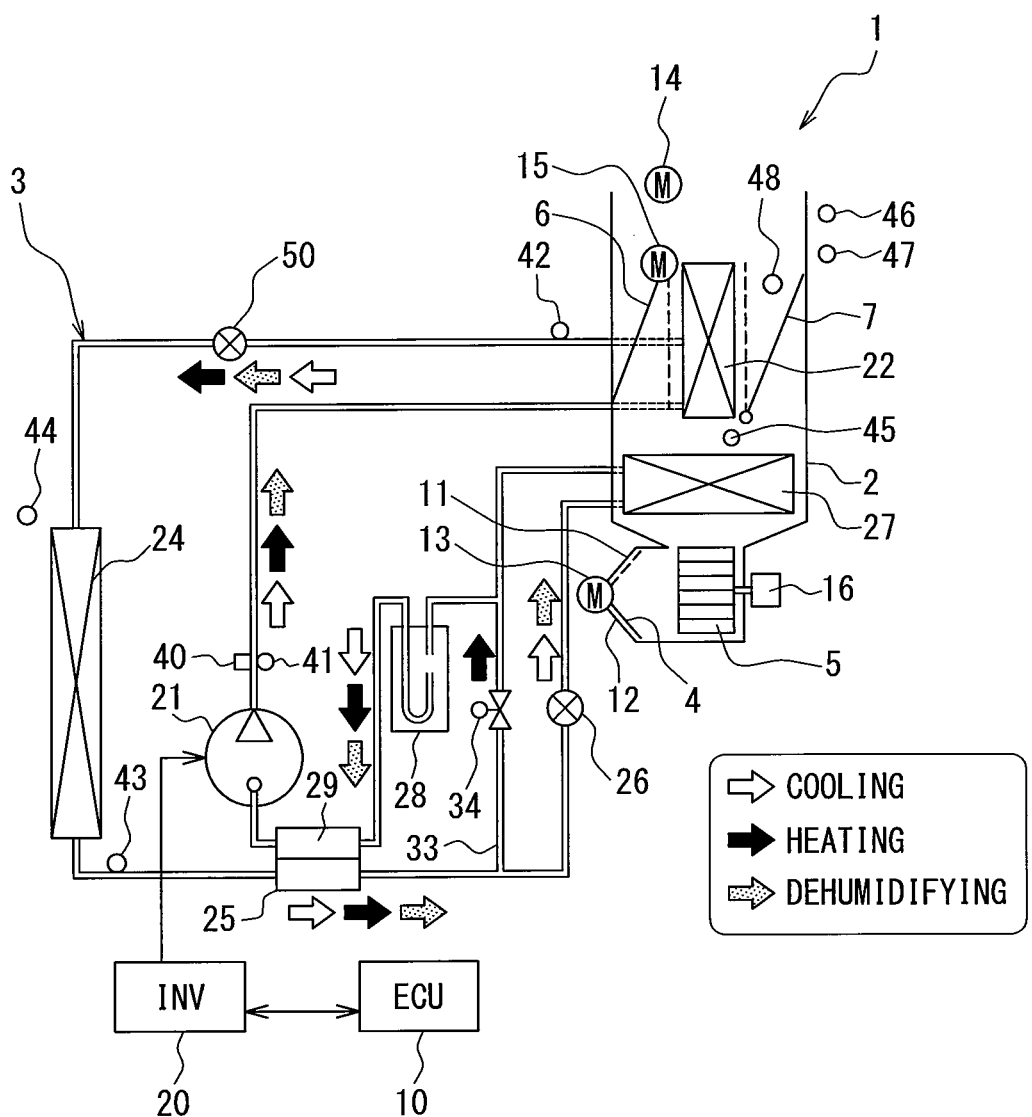
FIG. 2 is a schematic view illustrating a vehicle air-conditioner having the expansion valve device.

FIG. 1 is a cross-sectional view (partially including block diagram) illustrating a variable throttle valve 50 for heating which corresponds to an expansion valve device according to an embodiment and an air-conditioning control device 10 which controls the variable throttle valve 50. FIG. 2 illustrates an air-conditioner apparatus for a vehicle using the variable throttle valve 50.

As shown in FIG. 2, the air-conditioner apparatus has an air-conditioning unit 1 that performs an air-conditioning for a passenger compartment of the vehicle. Air-conditioning parts (actuators) in the air-conditioning unit 1 are controlled by the air-conditioning control device 10 (ECU). The air-conditioning unit 1 includes a refrigerating cycle 3 having a duct 2, a centrifugal type blower, an evaporator 27 and a gas cooler 22. The duct 2 defines an air passage that introduces conditioned-air into the passenger compartment. The blower generates air flow in the duct 2 toward the passenger compartment. The evaporator 27 cools air flowing through the duct 2. The gas cooler 22 reheats the air which passed through the evaporator 27.

The duct 2 is arranged at a front side of the passenger compartment in the vehicle. An inside air inlet 11 and an outside air inlet 12 are defined upstream of the duct 2 in the air flowing direction. The inside air inlet 11 intakes air inside of the passenger compartment (hereinafter referred as inside air). The outside air inlet 12 intakes air outside of the passenger compartment (hereinafter referred as outside air). An inside/outside air switching door 4 is rotatably disposed at inner sides of the inside air inlet 11 and the outside air inlet 12. The inside/outside air switching door 4 is driven by an actuator 13 such as a servo motor, and changes the air inlet mode between an outside air introduction mode (FRS) and an inside air circulation mode (REC).

Plural air outlets (not shown) are defined downstream of the duct 2 in the air flowing direction. The outlets includes at least a defroster outlet (DEF), a face outlet (FACE), and a foot outlet (FOOT). The defroster outlet blows off mainly warm air toward an inner surface of a windshield of the vehicle. The face outlet blows off mainly cold air toward an occupant's upper body (head and breast). The foot outlet blows off mainly warm air toward an occupant's lower body (foot). The air outlets are selectively opened or closed by plural mode-changing doors (not shown). The mode-changing doors are driven by an actuator 14 such as servo motor, thereby the air outlet mode (MODE) is switched among a face mode (FACE), a bilevel mode (B/L), a foot mode (FOOT), a foot defroster mode (F/D) and a defroster mode (DEF).

The centrifugal type blower has a centrifugal type fan 5 and a blower motor 16 which rotates the fan 5. The fan 5 is rotatably accommodated in a scroll casing that is integrally formed on the upstream side of the duct 2 in the air flowing direction. A rotation speed of the motor 16 is changed based on a terminal voltage of the blower motor 16 (blower control voltage, blower level) applied through a blower drive circuit (not shown), so that an amount of the air sent into the passenger compartment is controlled.

The refrigerating cycle 3 has a compressor 21, the gas cooler 22, a first decompressor, an outdoor heat exchanger 24, an internal heat exchanger, a second decompressor, the evaporator 27, an accumulator 28, and a refrigerant pipe which connects them annularly. The compressor 21 is rotated by an internal drive motor (not shown). The compressor 21 is an electric refrigerant compressor which compresses refrigerant drawn from the evaporator 27 to have high temperature and high pressure equal to or higher than a critical pressure, for example, and discharges the refrigerant. The compressor 21 is turned on (ON) when electricity is supplied, and is stopped (OFF) when the electricity supply is stopped. The rotating speed of the compressor 21 is controlled through an inverter 20 so that the compressor 21 has a target rotating speed which is calculated by the ECU 10.

The gas cooler 22 is arranged in the duct 2, downstream of the evaporator 27 in the air flowing direction. The gas cooler 22 is a heat exchanger for heating the passing air through heat exchange with the gas refrigerant which flows from the compressor 21. Air mix (NM) doors 6, 7 are rotatably supported by an air-inlet part and an air-outlet part of the gas cooler 22. The door 6, 7 controls a temperature of the air blown into the passenger compartment by controlling an amount of air passing through the gas cooler 22 and an amount of air bypassing the gas cooler 22. The NM door 6, 7 is driven by an actuator 15 such as servo motor.

The first decompressor is constructed by the variable throttle valve 50 into which the gas refrigerant flows from the gas cooler 22. The variable throttle valve 50 is a first decompression device which decompresses the refrigerant which flows out of the gas cooler 22 based on the valve opening degree, and may correspond to an electric expansion valve for heating (EVH). The valve opening degree is electrically controlled by the ECU 10. Moreover, the variable throttle valve 50 can be set to have a full-open mode by the ECU 10, so that the valve opening degree of the variable throttle valve 50 can be fully opened.

The outdoor heat exchanger 24 is disposed at a place which is easy to receive the running wind when the vehicle runs, outside of the duct 2 (for example, a front part of an engine compartment of the vehicle). Heat exchange is performed between refrigerant which flows through the inside of the heat exchanger 24 and air outside the passenger compartment (outside air) sent by an electric fan (not shown). The outdoor heat exchanger 24 operates as a heat sink which absorbs heat from outside air at a heating mode or dehumidifying mode (dehumidifying heating mode), and operates as a radiator which radiates heat to outside air at a cooling mode or dehumidifying mode.

The internal heat exchanger is a refrigerant-refrigerant heat exchanger which superheats the refrigerant to be drawn into an inlet port of the compressor 21. Heat exchange is performed between the high-temperature refrigerant flowing out of the outlet of the outdoor heat exchanger 24 and the low-temperature refrigerant flowing out of the outlet of the accumulator 28. The internal heat exchanger has two-layer heat exchange structure in which a face of a low temperature side heat exchanger 29 is tightly in contact with a face of a high temperature side heat exchanger 25 so as to enable the heat exchange.

The second compressor has a variable throttle valve 26 for cooling and a bypass pipe 33. Refrigerant flows into the throttle valve 26 from the high temperature side heat exchanger 25 of the internal heat exchanger. Refrigerant flowing out of the high temperature side heat exchanger 25 of the internal heat exchanger is sent to the accumulator 28 by bypassing the throttle valve 26 and the evaporator 27, due to the pipe 33. The variable throttle valve 26 is a second decompression device which decompresses the refrigerant which flows out of the high temperature side heat exchanger 25 of the internal heat exchanger based on the valve opening degree. The variable throttle valve 26 is an electric expansion valve for cooling (EVC), and the valve opening degree is electrically controlled by the ECU 10. An electromagnetic open/close valve 34 (VH: hereafter referred as electromagnetic valve for heating) is arranged in the pipe 33. The valve 34 is opened when electricity is supplied (ON), and is closed when the electricity supply is stopped (OFF).

The evaporator 27 is an air-refrigerant heat exchanger (heat absorber). The refrigerant decompressed by the throttle valve 26 is evaporated by exchanging heat with air sent by the fan 5. Heat of the air is absorbed by the evaporator 27. The evaporator 27 supplies the gas refrigerant to the low temperature side heat exchanger 29 of the internal heat exchanger and the compressor 21 through the accumulator 28. The accumulator 28 is a gas-liquid separating device which has a storage chamber for storing temporarily the refrigerant flowing from the evaporator 27.

A circulation circuit switching portion of the refrigerating cycle 3 switches the operation mode of the refrigerating cycle 3, that is, the circulation route of refrigerant in the refrigerating cycle 3 is switched among a circulation circuit for the cooling mode (cooling cycle), a circulation circuit for the heating mode (heating cycle), and a circulation circuit for the dehumidifying mode or the dehumidifying heating mode (dehumidifying cycle). In the present embodiment, the variable throttle valve 50 and the electromagnetic valve 34 may correspond to the circulation circuit switching portion.

Specifically, when the variable throttle valve 50 for heating has the full open mode, and when the electromagnetic valve 34 for heating is closed, the operation mode of the refrigerating cycle 3 is set into the cooling cycle (circulation circuit for the cooling mode). Moreover, when the valve 50 has a decompression mode in which the refrigerant is decompressed and expanded to have a small flow rate, and when the valve 34 is opened, the operation mode of the refrigerating cycle 3 is set into the heating cycle (circulation circuit for the heating mode). Moreover, when the valve 50 has the decompression mode, and when the valve 34 is closed, the operation mode of the refrigerating cycle 3 is set into the dehumidifying cycle (circulation circuit for the dehumidifying mode).

Here, the refrigerating cycle 3 of this embodiment uses a refrigerant whose main component is made of carbon dioxide ($CO_2$) having low critical temperature. The refrigerating cycle 3 is a super critical vapor compression type heat pump cycle. The refrigerant discharged from the outlet port of the compressor 21 has a high pressure equal to or higher than the critical pressure. In the super critical vapor compression type heat pump cycle, the refrigerant temperature of the inlet part of the gas cooler 22 (inlet temperature of refrigerant) is raised to about 120° C. by raising the refrigerant pressure on the high pressure side. That is, the temperature of the refrigerant discharged from the discharge port of the compressor 21 is raised to about 120° C. In addition, the refrigerant flowing into the gas cooler 22 is not condensed even if the refrigerant radiates heat in the gas cooler 22, because the refrigerant is pressurized by the compressor 21 to have the pressure equal to or higher than the critical pressure.

The ECU 10 includes a known microcomputer having a CPU which performs a controlling process and a calculating process, a memory (ROM, RAM) which stores a variety of programs and data, an I/O port and a timer function, for example. When an ignition switch of the vehicle is turned on (IG-ON), electricity is supplied to the ECU 10. The ECU 10 electrically controls each actuator (such as the servo motor 13-15, the blower motor 16, the variable throttle valve 26, 50, the electromagnetic valve 34, and the inverter 20) of the air-conditioning unit 1 based on manipulate signal input from an air-conditioner console panel (not shown), sensor signal input from various sensors, and a control program stored in the memory.

The air-conditioner console panel has a temperature setting switch, an air-conditioner (A/C) switch, an air inlet setting switch (FRS/REC switch), an air outlet setting switch (MODE switch), a defroster (DEF) switch, an air amount switch, an auto (AUTO) switch, a turn-off (OFF) switch and the like. The air-conditioner (A/C) switch is a cooling or dehumidifying switch that orders cooling or dehumidifying for the passenger compartment. The air-conditioner (A/C) switch is a setting portion of the cooling/dehumidifying that orders the cooling mode or the dehumidifying mode among the operation modes of the refrigerating cycle 3. The compressor 21 of the refrigerating cycle 3 may be compulsorily activated by turning on the A/C switch, and may be compulsorily stopped by turning off the A/C switch.

The DEF switch is a DEF mode fix switch which orders to fix the air outlet mode into the DEF mode. The DEF switch is a fogging prevention switch which removes or prevents the fogging of the windshield. Further, the DEF switch is a dehumidifying mode selecting portion which orders to fix the operation mode of the refrigerating cycle 3 into the dehumidifying mode. The dehumidifying mode selecting portion sets the dehumidifying mode which is one of a dehumidifying priority mode or blow-off temperature priority mode. Alternatively, the dehumidifying mode selecting portion may be an anti-fogging sensor that detects the fogging of the windshield, other than the DEF switch. The dehumidifying mode selecting portion may be a dehumidifying switch that orders only the dehumidifying in the passenger compartment without fixing the air outlet mode into the DEF mode when the switch is turned on. The dehumidifying mode selecting portion may be a anti-fogging switch that orders only the prevention of the fogging for the windshield without fixing the air outlet mode into the DEF mode when the switch is turned on.

The AUTO switch is a switch which automatically sets the operation mode of the refrigerating cycle 3 into the cooling mode, the heating mode, or the dehumidifying mode based on at least a target blow off temperature (TAO). The AUTO switch is an automatic control switch which orders to automatically control each actuator of the air-conditioning unit 1. For example, when the MODE change switch or the air amount setting switch is operated, automatic air-conditioning control for switching the air outlet mode or for controlling the blower motor is cancelled.

A discharge pressure sensor 40 detects a discharge pressure (SP) of the refrigerant discharged from the outlet port of the compressor 21. A discharge temperature sensor 41 detects a discharge temperature (TD) of the refrigerant discharged from the outlet port of the compressor 21. A first refrigerant temperature sensor 42 detects a refrigerant temperature (TCO) discharged from the outlet part of the gas cooler 22. A second refrigerant temperature sensor 43 detects a refrigerant temperature (THO) which flows out of the outlet part of the outdoor heat exchanger 24. Sensor signals output from the sensors 40, 41, 42 and 43 have A/D conversion at an input circuit (A/D conversion, not shown in FIG. 2, refer to an input processor 102 in FIG. 1), and the converted signal is input into the microcomputer. The discharge pressure sensor 40 is a high pressure detector that detects the high pressure of the refrigerating cycle 3. The discharge temperature sensor 41 is also a refrigerant detector that detects the inlet temperature of the refrigerant which flows into the inlet part of the gas cooler 22.

An outside air temperature sensor 44 detects a temperature of outside air (TAM) which is an air temperature outside of the passenger compartment. A temperature sensor 45 (which may correspond to a dehumidifying capacity detector of the present disclosure) detects an air temperature (TE: hereafter referred as after-evaporator temperature) just downstream of the evaporator 27. An inside air temperature sensor 46 detects a temperature of inside air (TR) which is an air temperature inside of the passenger compartment. A solar sensor 47 detects a solar radiation amount (TS) into the passenger compartment. A temperature sensor 48 (which may correspond to a heating capacity detector of the present disclosure) detects an air temperature (TGC: hereafter referred as after-gas-cooler temperature) just downstream of the gas cooler 22. Sensor signals output from the sensors 44, 45, 46, 47 and 48 have A/D conversion at the A/D conversion circuit, and the converted signal is input into the microcomputer.

An operation of the air-conditioning apparatus will be briefly described hereinafter.

For example, when the ignition switch is in the ON state and when the electricity is supplied to the ECU 10, the ECU 10 selects the operation mode of the refrigerating cycle 3 based on the manipulate signal transmitted from each switch (not shown) of the air-conditioner console panel, the sensor signal transmitted from the various sensors, and the control program stored in the memory. Thus, each actuator (the servo motor 13-15, the blower motor 16, the variable throttle valve 26, 50, the electromagnetic valve 34, and the inverter 20) of the air-conditioning unit 1 is electrically controlled.

For example, when the AUTO switch is turned on so as to perform the automatic air-conditioning control, the ECU 10 intakes the sensor signal from the various sensors, and the manipulate signal from the air-conditioner console panel. The signals are necessary for controlling each air-conditioning member (actuator) in the air-conditioning unit 1. Next, the target blow off temperature (TAO) of the conditioning air which is blown off into the passenger compartment is computed based on a computing equation beforehand stored in the memory.

Next, the compressor operation judging is performed for determining whether the compressor 21 is turned on or off, based on the air-conditioner (A/C) switch, for example. When a result of the compressor operation judging indicates the turning-on of the compressor 21 based on the previously-computed target blow off temperature (TAO), an operation mode judging is performed for determining the operation mode of the refrigerating cycle 3.

In the operation mode judging, the target blow off temperature (TAO) is compared with a first specified value $\alpha$ (for example, 45° C.) and a second specified value $\beta$ (for example, 15° C.). In the case of TAO≥$\alpha$, the heating cycle (heating mode) is chosen as the operation mode of the refrigerating cycle 3. In the case of TAO≤$\beta$, the cooling cycle (cooling mode) is chosen as the operation mode of the refrigerating cycle 3. In the case of $\beta$<TAO<$\alpha$, the dehumidifying cycle (dehumidifying mode) is chosen as the operation mode of the refrigerating cycle 3.

After the operation mode of the refrigerating cycle 3 is chosen, a terminal voltage impressed to the blower motor 16 (blower control voltage, blower level), an opening degree of the door 4 which changes the air inlet mode (between the inside air mode and the outside air mode), an opening degree of the mode switching door which change the air outlet mode, and an opening degree of the A/M door 6, 7 (A/M opening degree) are determined, and the actuators are controlled to drive the blower and the doors.

The operation mode of the refrigerating cycle 3 is set. Operational status of the compressor 21 (rotating speed etc.), the opening degree of the variable throttle valve 50, 26, and the opening/closing state of the electromagnetic valve 34 are set and controlled in a manner that the cycle efficiency of the refrigerating cycle 3 is maximized in each operation mode.

When the cooling mode is chosen as the operation mode of the refrigerating cycle 3, the variable throttle valve 50 has the full-open mode, and the electromagnetic valve 34 is closed. The refrigerant discharged from the outlet of the compressor 21 circulates in order of the gas cooler 22, the full-opened valve 50, the outdoor heat exchanger 24, the high temperature side heat exchanger 25, the valve 26, the evaporator 27, the accumulator 28, the low temperature side heat exchanger 29 and the compressor 21, (as shown in a blank arrow direction of FIG. 2, in the circulation circuit for the cooling mode, cooling cycle).

At this time, the opening degree of the NM door 6, 7 is controlled to have a full-close state (MAX-COOL). The refrigerant of high-temperature and high-pressure discharged from the compressor 21 does not radiate heat while passing through the gas cooler 22. Therefore, the air cooled in the evaporator 27 flows through the duct 2 so as to bypass the gas cooler 22. For example, the air is blown off from the FACE outlet into the passenger compartment, so that the passenger compartment is cooled to have a desired temperature (set temperature). Further, in the internal heat exchanger, heat is exchanged between the high temperature and high pressure refrigerant flowing through the high temperature side heat exchanger 25 from the outdoor heat exchanger 24 and the low temperature and low pressure refrigerant flowing through the low temperature side heat exchanger 29 from the accumulator 28. Thus, the high temperature and high pressure refrigerant flowing into the evaporator 27 is cooled. Thereby, the evaporator enthalpy increases, so that the cycle efficiency of the refrigerating cycle 3 can be improved by saving power or electricity.

When the heating mode is chosen as the operation mode of the refrigerating cycle 3, the variable throttle valve 50 has the decompression mode, and the electromagnetic valve 34 is opened. The refrigerant discharged from the outlet of the compressor 21 circulates in order of the gas cooler 22, the valve 50, the outdoor heat exchanger 24, the high temperature side heat exchanger 25, the valve 34, the accumulator 28, the low temperature side heat exchanger 29 and the compressor 21, (as shown in a black arrow direction of FIG. 2, in the circulation circuit for the heating mode, heating cycle). At this time, the valve 26 may be fully closed.

At this time, the opening degree of the NM door 6, 7 is controlled to have a full-open state (MAX-HOT). The high temperature and high pressure refrigerant discharged from the compressor 21 radiates heat to the air in the duct 2 while passing through the gas cooler 22. The air is blown off from the FOOT outlet into the passenger compartment, so that the passenger compartment is heated to have a desired temperature (set temperature). In the internal heat exchanger, heat exchange is not performed, because low temperature and low pressure refrigerant passes each of the heat exchangers 25, 29.

When the dehumidifying mode is chosen as the operation mode of the refrigerating cycle 3, the variable throttle valve 50 has the decompression mode, and the electromagnetic valve 34 is closed. The refrigerant discharged from the outlet of the compressor 21 circulates in order of the gas cooler 22, the valve 50, the outdoor heat exchanger 24, the high temperature side heat exchanger 25, the valve 26, the evaporator 27, the accumulator 28, the low temperature side heat exchanger 29 and the compressor 21, (as shown in a hatched arrow direction of FIG. 2, in the circulation circuit for the dehumidifying mode, dehumidifying cycle).

At this time, air is cooled and dehumidified in the evaporator 27, and the air is reheated in the gas cooler 22. The air is blown off into the passenger compartment from the DEF outlet or the FOOT outlet, for example. The passenger compartment is dehumidified and heated in a manner that the passenger compartment has a desired temperature (set temperature) and in a manner that the fogging of the windshield is removed or prevented. The discharge pressure of the refrigerant discharged from the compressor 21 and the refrigerant pressure of the outdoor heat exchanger 24 are variable by the throttling degree of the variable throttle valve 50, 26. Thus, the throttling degree is controlled in a manner that the heating capacity of the gas cooler 22 (a temperature of air flowing out of the gas cooler or flowing into the passenger compartment) or the dehumidifying capacity of the evaporator 27 (a temperature of air flowing out of the evaporator) has a target value.

Specifically, if the throttling, degree is controlled in a manner that the discharge pressure of the refrigerant discharged from the compressor 21 and the refrigerant pressure of the outdoor heat exchanger 24 become low (the opening degree of the valve 50: small, the opening degree of the valve 26: large), the outdoor heat exchanger 24 functions (operates) as a heat sink, so that the heat amount radiated by the gas cooler 22 increases. At this time, for example. Therefore, the blow off temperature of the conditioned air blown into the passenger compartment has a comparatively high temperature.

In contrast, if the throttling degree is controlled in a manner that the discharge pressure of the refrigerant discharged from the compressor 21 and the refrigerant pressure of the outdoor heat exchanger 24 become high (the opening degree of the valve 50: large, the opening degree of the valve 26: small), the outdoor heat exchanger 24 functions (operates) as a radiator, so that the heat amount radiated by the gas cooler 22 decreases. Therefore, the blow off temperature of the conditioned air blown into the passenger compartment has a comparatively low temperature.

Next, the variable throttle valve 50 for heating and the air-conditioning control device 10 which controls the valve 50 will be explained.

As shown in FIG. 1, the variable throttle valve 50 includes a housing 51, a seat component 52, a valve member 53, a spring 54, a motor 55, a plate component 56, a ring component 57, an O-ring 58 and a deceleration mechanism 59.

The housing 51 is made of metal material, for example, and has an approximately L-shaped refrigerant passage 51a through which the refrigerant circulates. In the housing 51, the cylindrical seat component 52 made of metal material is disposed at the bending part of the refrigerant passage 51a so that inside space of the seat component 52 defines a part of the refrigerant passage 51a. The seat component 52 has a top face, and an inner periphery of the top face defines a seat 52a.

The valve member 53 is made of metal material, for example, and is disposed in the refrigerant passage 51a of the housing 51. A main part of the valve member 53 has an approximately truncated cone shape, and an outer periphery of a lower end face of the valve member 53 defines a seating part which is seated to or separated from the seat 52a of the seat component 52. The valve member 53 has a shaft 53a extending upward from the main part in FIG. 2. The shaft 53a is arranged in a through hole part of the housing 51 extending in the axis direction of the shaft 53a, and an upper end of the shaft 53a is located to project from the housing 51.

The motor 55 is constructed by a stepping motor, and is arranged on the upper side of the housing 51. The motor 55 has a case 553 having an approximately dome shape constructed by a cylindrical part and a hemisphere part which closes the upper end of the cylindrical part. A ring-shaped stator 551 is arranged to the outer periphery side of the cylindrical part of the case 553, and a rotor 552 is arranged inside of the cylindrical part.

A lower end of the cylindrical part of the case 553 has a flange part extending outward in the radial direction. The O-ring 58 corresponding to a seal member is interposed between the flange part and the housing 51. The metallic plate component 56 is screwed to the housing 51, and presses the flange part onto the housing 51 through the ring component 57 arranged above the flange part of the case 553. Thereby, the sealing can be achieved between the housing 51 and the case 553 of the motor 55 over all the circumference.

The stator 551 is arranged on the upper side of the plate component 56, and has two-phase structure constructed of an A phase coil 551A and a B phase coil 551B. The motor 55 is, what is called, a two-phase stepping motor.

The rotor 552 arranged in the case 553 is made of magnetic material. The rotor 552 has an approximately pillar-shaped main part 552a and a cylindrical magnet 552b. A part of the main part 552a is removed in ring-recess shape from the both of the upper face and the lower face. The cylindrical magnet 552b is made of a permanent magnet, and is arranged on the outer circumference face of the main part 552a. The cylindrical magnet 552b is magnetized at even pitch in a rotation direction of the rotor 552.

A concave portion is defined in the main part 552a of the rotor 552, and is recessed upward from the center part of the lower face. The upper end of the shaft 53a of the valve member 53 is fixed to a ceiling face part of the concave portion.

A thread part is formed on the inner circumference face of the concave portion of the main part 552a of the rotor 552. On the other hand, a cylindrical male thread part 51b is fixed to the housing 51, and projects upward. A male thread is formed on the outer circumference face of the male thread part 51b.

The deceleration mechanism 59 constructed by combining plural gears is arranged between the inner circumference face of the concave portion of the main part 552a of the rotor 552 and the outer circumference face of the male thread part 51b. The deceleration mechanism 59 may be made of, for example, a planetary gear mechanism having a sun gear and a planetary gear. Alternatively, the deceleration mechanism 59 may constructed by combining plural spur wheels.

The deceleration mechanism 59 has an input gear which meshes with the screw part formed in the inner circumference face of the concave portion of the main part 552a of the rotor 552, and an output gear which meshes with the male thread formed in the outer circumference face of the male thread part 51b, and slows down rotation of the rotor 552 and transmits it to the male thread part 51b.

Thereby, rotation of the rotor 552 displaces the rotor 552 in the axial direction (up-and-down direction in the drawing). Since the deceleration mechanism 59 is adopted between the rotor 552 and the male thread part 51b, the displacement amount of the rotor 552 in the axial direction is comparatively small relative to the rotation amount of the rotor 552.

When the rotor 552 is rotated and is displaced in the axis direction, the valve member 53 fixed to the main part 552a of the rotor 552 is also displaced, so as to change the opening degree between the valve member 53 and the seat 52a.

A construction defined by the motor 55, the deceleration mechanism 59 and the male thread part 51b threaded to the rotor 552 via the deceleration mechanism 59 may correspond to an electric driver having a stepping motor and controlling an opening degree of a refrigerant passage by displacing a valve member in accordance with a rotation angle of the stepping motor.

As clearly shown in FIG. 1, the shaft 53a of the valve member 53 has a step part. The spring 54 is interposed between the step part and the ceiling face of the main part 552a of the rotor 552. Thereby, if the rotor 552 is displaced downward after the valve member 53 is seated on the seat 52a, the spring 54 is compressed, so that excess load is restricted from applying to a seating part defined between the valve member 53 and the seat 52a.

Moreover, the rotor 552 is restricted from having excess rotational displacement because a pin component 51c projected from the housing 51 and a pin component 552c projected from the rotor 552 contact with each other.

As shown in FIG. 1, the ECU 10 has an air-conditioning control 101, an input processor 102 and a drive unit 103. The input processor 102 processes a signal input from each switch or sensor, and the processed signal is sent to the air-conditioning control 101. The drive unit 103 outputs value information determined by the control 101 as an electric signal so as to control each actuator (the servo motor 13-15, the blower motor 16, the throttle valve 26, the electromagnetic valve 34 or the inverter 20).

The ECU 10 further has a step drive control 111, a drive unit 113, and an input processor 112. The step drive control 111 receives a command about the opening degree of the valve 50 that is determined by the air-conditioning control 101, and determines drive information (e.g., current value) for the motor 55 based on the command. Specifically, a driving direction (rotation direction) of the motor 55 of the valve 50 and a number of steps (pulse number) in the driving of the motor 55 of the valve 50 are set by the step drive control 111, for example. The drive unit 113 energizes the A-phase coil 551A and the B-phase coil 551B of the stator 551 through PWM control based on the drive information of the valve 50 determined by the step drive control 111. The current values of the A phase coil 551A and the B phase coil 551B are input into the input processor 112, and the input processor 112 performs feedback control relative to the step drive control 111.

The step drive control 111 inputs the command about the opening degree of the valve 50 determined by the air-conditioner control 101, and determines the drive information such as driving direction (rotation direction) of the motor 55 of the valve 50 and number of steps (pulse number) based on the input command and the actual valve opening degree. Further, the step drive control 111 may determine the instruction of the current value by determining a change in the operation cycle mode, and may output the instruction to the drive unit 113.

The step drive control 111, the input processor 112, and the drive unit 113 may define a drive control device which drives and controls the stepping motor.

When the cooling mode is selected as the operation mode of the refrigerating cycle 3, the air-conditioner control 101 outputs an instruction of the valve opening to the step drive control 111. The instruction of the valve opening orders the variable throttle valve 50 to be fully opened. When the heating mode or dehumidifying mode (dehumidifying heating mode) is chosen as the operation mode of the refrigerating cycle 3, the air-conditioner control 101 outputs an instruction of the valve opening to the step drive control 111. The instruction of the valve opening orders the variable throttle valve 50 to decompress and expand the refrigerant in a manner that the operation efficiency of the refrigerating cycle 3 becomes better for performing a desired air-conditioning.

Figure 3:
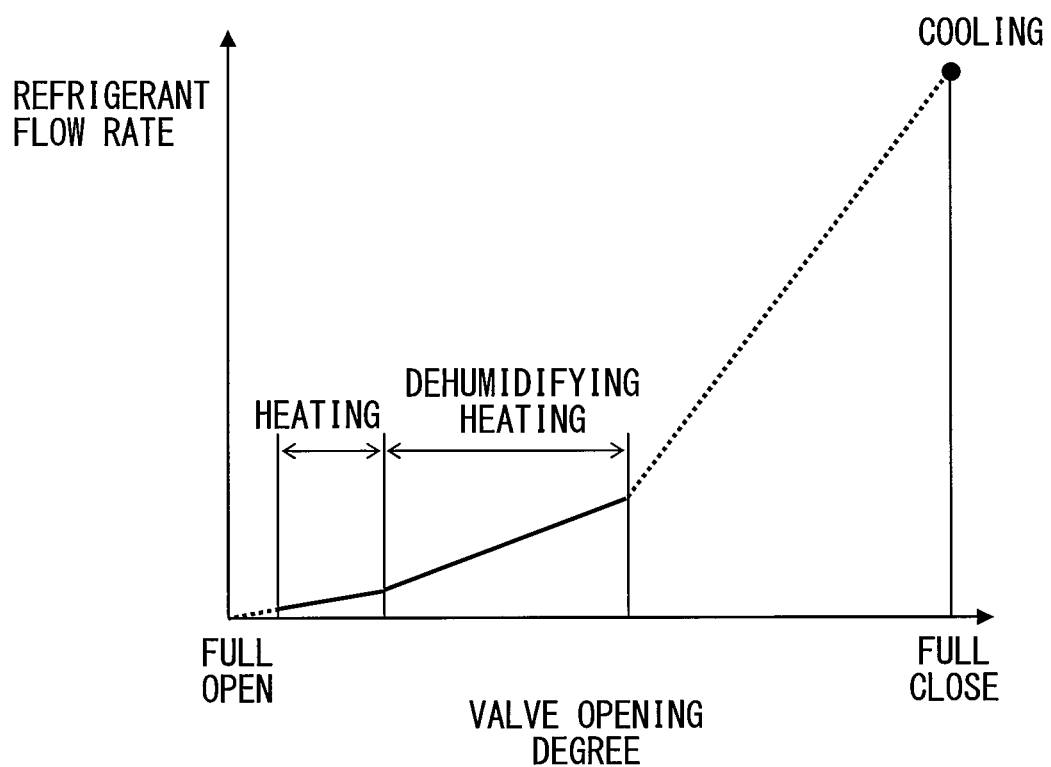
FIG. 3 is a graph illustrating a relationship between a valve opening degree and a refrigerant flow rate at each operation mode of a refrigerating cycle.

FIG. 3 is a graph illustrating a relationship between the valve opening degree and the refrigerant flow rate in each of the cooling mode, the dehumidifying heating mode, and the heating mode. The variable throttle valve 50 has an instruction region of the valve opening shown by the solid line and the black dot. In the heating mode, a suitable valve opening is instructed within a small flow rate control region where the refrigerant flow rate is comparatively small. In the dehumidifying heating mode, a suitable valve opening is instructed within an intermediate flow rate control region. In the cooling mode, the maximum valve opening is instructed to have the maximum flow rate in a large flow rate region.

Figure 4:
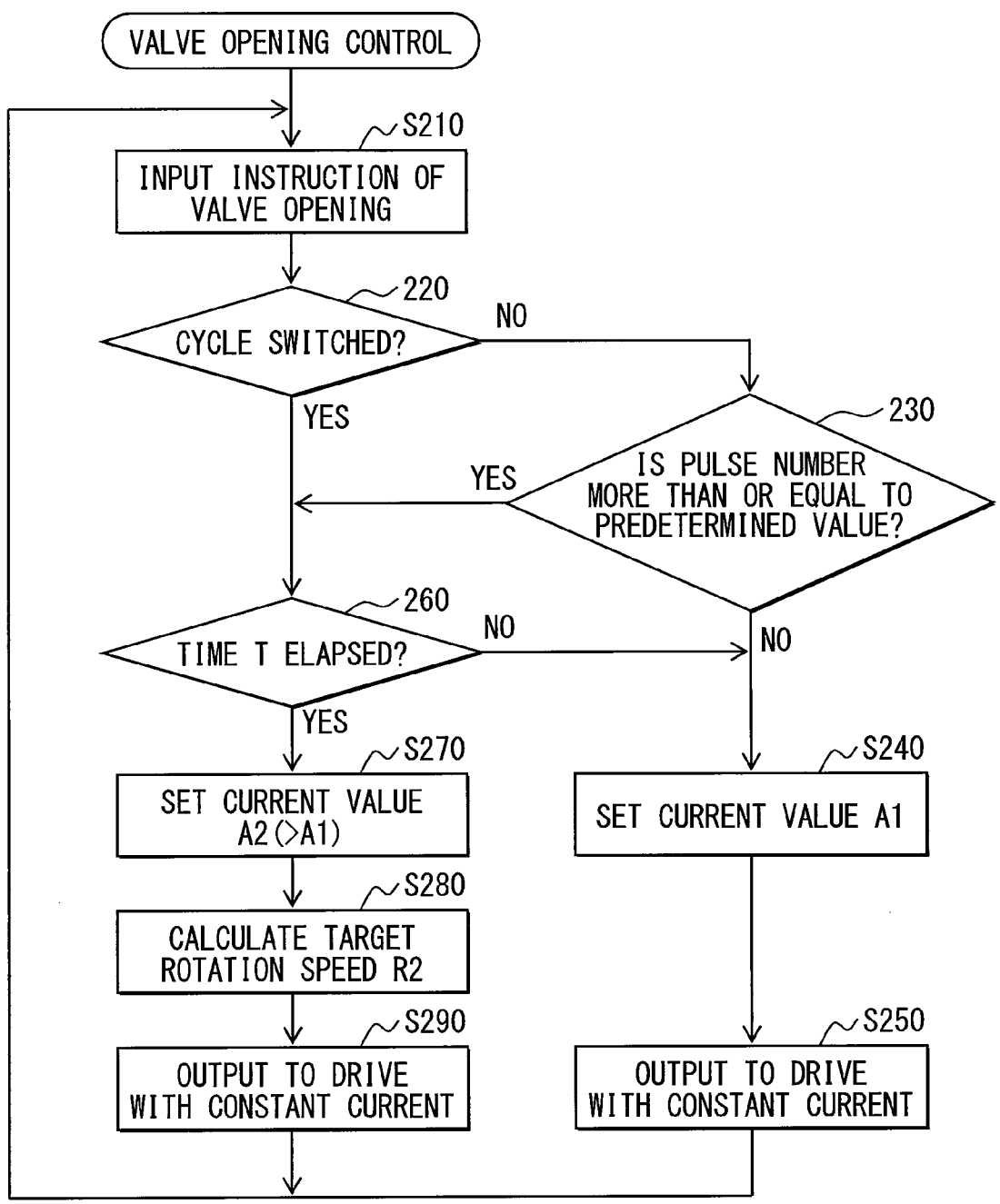
FIG. 4 is a flow chart illustrating a valve opening control by a drive control device of the expansion valve device.

Next, the opening degree control of the valve 50 performed by the drive control device of the present embodiment which consists of the step drive control 111, the input processor 112, and the drive unit 113 is explained. FIG. 4 is a flow chart illustrating the outline of the valve opening control by the drive control device.

As shown in FIG. 4, the drive control device inputs the drive direction (open direction) and the number of steps (the number of pulses) of the motor 55 of the valve 50 determined by the air-conditioner control 101 and information about a change in the operation cycle mode (S210).

Here, the valve opening instruction for the valve 50 is input, and the drive information such as the drive direction (open direction) and the number of steps (the number of pulses) of the motor 55 of the valve 50 is determined based on the input valve opening instruction and the actual valve opening. Further, the change in the operation cycle mode may be determined based on, for example, the characteristic value shown in FIG. 3.

Next, it is determined whether there is a change in the operation cycle based on S210 (S220). When it is determined that there is no change in the operation cycle in S220, it is determined whether the number of steps (the number of pulses) to be performed by the motor 55 is more than or equal to a predetermined value (S230).

When it is determined that the number of steps is not more than or equal to the predetermined value (less than the predetermined value) in S230, a current value A1 (predetermined current value at a normal time) is set as a current value of a constant current drive (S240). Then, the constant current drive is performed by outputting the current value A1 such that the motor has a normal rotation speed R1 (S250). Then, the drive control device is returned to S210.

When it is determined that there is no change in the operation cycle in S220, and when it is determined that the number of steps is more than or equal to the predetermined value in S230, (that is the case where it is determined that the change degree in the valve opening is large, i.e., more than or equal to the predetermined value, although there is no change in the operation cycle), the drive control device progresses to S260.

In S260, it is determined whether a predetermined time T has passed since the last increase in the current value. The lapsed time from the last increase in the current value is time lapsed after immediately performing S270, S280, and S290 which are mentioned later. When it is determined that the predetermined time T has not passed since the last increase in the current value in S260, the drive control device progresses to S240.

When the current value of the constant current drive is increased by performing S270, S280, and S290, the temperature of the drive control device (specifically, component parts of the drive control device) is increased. The predetermined time T which is a judgment value in S260 is a threshold used for determining whether the temperature of the component parts of the drive control device is lowered after the temperature was increased accompanying the increase in the current value.

Therefore, when it is determined that the predetermined time T has not passed since the last increase in the current value in S260, it is determined that the temperature of the component parts of the drive control device is not sufficiently lowered. If the current value is increased again, there is a possibility that the component parts of the drive control device may have too high temperature, and may generate a functional error, so the increase in the current value is forbidden.

When it is determined that the predetermined time T has passed since the last increase in the current value in S260, a current value A2 (predetermined current value at a high speed rotation time) which is larger than the current value A1 is set as a current value of a constant current drive (S270), since it is presumed that the temperature of the component parts of the drive control device is sufficiently lowered. Then, a target rotation number R2 of the motor 55 is computed based on the instruction value of the number of pulses inputted in S210 and a predetermined permission time for the cycle change (S280).

After S280 is executed, a constant current drive is performed with the current value A2 to achieve the target rotation number R2 of the motor 55 (S290). After that, the drive control device is returned to S210.

Accordingly, the drive control device of this embodiment which consists of the step drive control 111, the input processor 112, and the drive unit 113 of the ECU 10 increases the current value used for the constant current drive of the motor 55 when a mode change is performed among three modes, i.e., the heating mode of the refrigerating cycle 3 in which the rate of refrigerant flowing through the refrigerant passage 51a of the valve 50 is lower than or equal to a first predetermined value, the dehumidifying heating mode of the refrigerating cycle 3 in which the rate of refrigerant flowing through the refrigerant passage 51a exceeds the first predetermined value and is lower than or equal to a second predetermined value, and the cooling mode of the refrigerating cycle 3 in which the rate of refrigerant flowing through the refrigerant passage 51a is the maximum in a flow region exceeding the second predetermined value, than the constant current value used when the flow rate control is conducted within the heating mode and the constant current value used when the flow rate control is conducted within the dehumidifying heating mode.

Accordingly, when a voltage supplied from the power source is changed, the drive control device can stably drive the motor 55 with the constant current drive.

Moreover, when a mode change is performed between the heating mode where the valve opening is changed within the small flow region lower than or equal to the first predetermined value to decompress and expand the refrigerant and the dehumidifying heating mode where the valve opening is changed within the intermediate flow region exceeding the first predetermined value to decompress and expand the refrigerant, the current value of the constant current drive of the motor 55 is increased than the constant current value used when the valve opening degree is changed in each of the modes. Thereby, when a mode is changed between the heating mode and the dehumidifying heating mode, the generating torque of the motor 55 is increased to displace the valve member 53, so that the valve opening degree can be quickly changed.

In this case, a mode in which the valve opening is changed at the time of heating mode corresponds to a first mode in which the opening degree of the refrigerant passage is changed within the first flow region lower than or equal to a predetermined value, and a mode in which the valve opening is changed at the time of dehumidifying heating mode corresponds to a second mode in which the opening degree of the refrigerant passage is changed within the second flow region exceeding the predetermined value.

Furthermore, when a mode change is performed between the heating mode and the dehumidifying heating mode where the valve opening is changed within a small to intermediate flow region lower than or equal to a second predetermined value to decompress and expand the refrigerant and the cooling mode where the valve opening is changed within a large flow region exceeding the second predetermined value to make the valve opening degree the maximum, the current value of the constant current drive of the motor 55 is increased than the constant current value used when the valve opening degree is changed within the heating mode and the dehumidifying heating mode. Thus, when the mode change is performed between the heating mode and the dehumidifying heating mode where the refrigerant is decompressed and expanded and the cooling mode where the refrigerant is not decompressed at the full open mode, the generating torque of the motor 55 is increased to displace the valve member 53, so that the valve opening degree can be quickly changed.

In this case, a mode in which the valve opening is changed at the time of heating mode and dehumidifying heating mode corresponds to a first mode in which the opening degree of the refrigerant passage is changed within the first flow region lower than or equal to a predetermined value, and a mode in which the valve opening is changed at the time of cooling mode corresponds to a second mode in which the opening degree of the refrigerant passage is changed within the second flow region exceeding the predetermined value.

Figure 5:
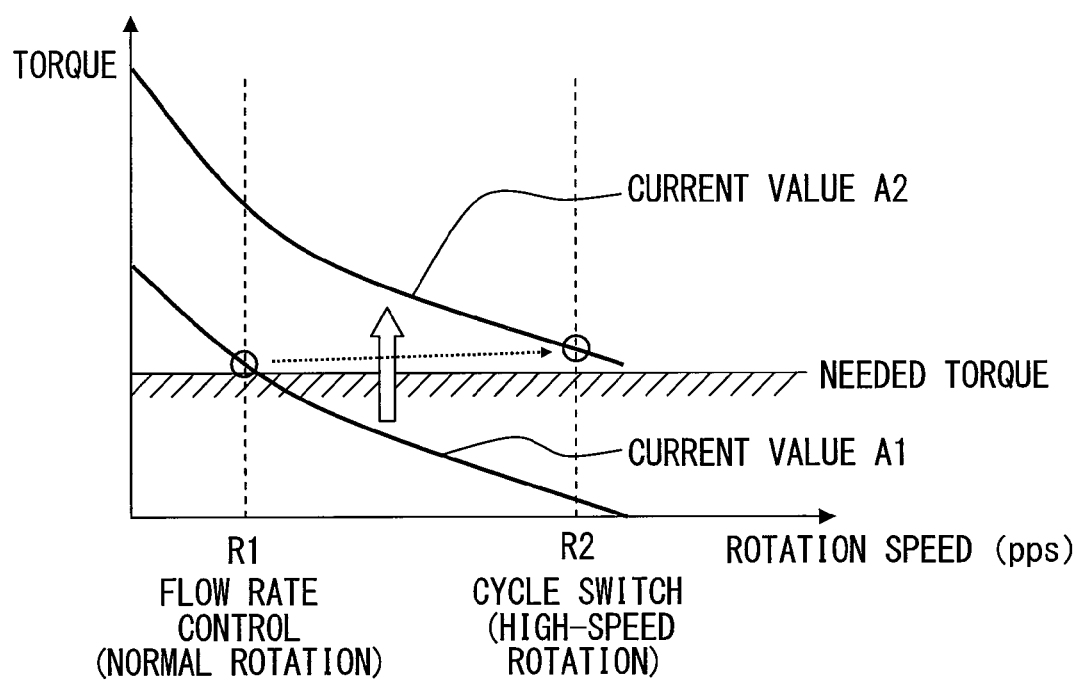
FIG. 5 is a graph illustrating a relationship between a rotation speed and a generating torque of a motor of the expansion valve device.

As shown in FIG. 5, if the current value is set constant, for example, at A1 when the motor 55 which consists of stepping motor is driven with the constant current, high speed rotation cannot be carried out, because the generating torque is decreased in response to the instruction of the high speed rotation at a cycle switch time. In this embodiment, at the time of cycle switch which needs a high speed rotation, the current value is increased to A2 to increase the generating torque, such that the high speed rotation can be achieved.

Thereby, when a mode change is performed between a mode where the valve opening degree is changed within a comparatively small flow control region and a mode where the valve opening degree is changed within a comparatively large flow control region, time taken for reaching the set valve opening degree can be shortened. Moreover, it is not necessary to enlarge the size of the motor.

Moreover, in S260 shown in FIG. 4, the drive control device prohibits the increase in the current value by performing S240 and S250 even at a mode switch time, when the time lapsed from the last increase in the current value is short (on the short side) relative to the predetermined time T such that a value of physical quantity related to the temperature of the component parts of the drive control device is high.

If the temperature of component parts of the drive control device becomes high, the drive control device may have function error. Therefore, when the value of physical quantity related to the temperature of component parts of the drive control device is higher than a threshold value, even at a mode switch time, the increase in the current value is prohibited, thereby restricting the increase in the temperature of the component parts of the drive control device. Thus, the drive control device can be restricted from having the function error. Moreover, in such a case, although the stepping motor becomes difficult to have high speed rotation, since the electric power applied to the motor 55 can be reduced, it can improve the operation efficiency.

Moreover, in S280 shown in FIG. 4, the drive control device calculates the target rotation speed of the stepping motor from the instruction value of the number of pulses and the permission time of the cycle switch, and, in S290, the drive control device drives by outputting the constant current to achieve the target rotation speed. Therefore, at the time of cycle switch (at the time of mode switch), the rotation of the stepping motor can be made higher according to a required degree, so generation of heat in the drive control device can be controlled.

Moreover, in S230 shown in FIG. 4, the drive control device allows the stepping motor to have high speed rotation in S260, S270, S280, and S290 even not at a cycle switch time, namely, when the change degree in the valve opening is large, i.e., the number of pulses at the time of changing the valve opening degree is more than or equal to a predetermined value, even in the same mode. Therefore, time to take to reach the set valve opening degree can be shortened even not at a mode switch time.

Moreover, according to the present embodiment, the variable throttle valve 50 for heating is equipped with the deceleration mechanism 59 which slows down rotation of the stepping motor, and the valve member 53 is displaced by the rotation of the stepping motor through the deceleration mechanism 59. Though high flow control accuracy can be achieved by the valve 50 equipped with the deceleration mechanism 59 which slows down rotation of the stepping motor, if the stepping motor is rotated only with a usual rotation speed, it may take much time to move the valve member 53 at the time of changing the valve opening degree. Therefore, it is very effective to apply the present disclosure to the valve 50 equipped with the deceleration mechanism 59.

Though omitted in the explanation of the refrigerating cycle system with reference to FIG. 2, as shown in FIG. 1, a high pressure side refrigerant pressure sensor 40A is arranged for detecting the pressure in the refrigerant passage 51a upstream of the valve member 53, i.e., for detecting the refrigerant pressure before the valve 50 decompresses the refrigerant in the refrigerating cycle. The step drive control 111 may change the current value of the constant current drive of the motor 55 according to the refrigerant pressure detected by the high pressure side refrigerant pressure sensor 40A. Specifically, as the detected refrigerant pressure becomes larger, the current value of the constant current drive may be increased.

Thus, the current value of the constant current drive is increased according to increase in the refrigerant pressure upstream of the valve member 53 in the refrigerant passage 51a. In this case, when a load level increases, the current value of the constant current drive is increased to increase the maximum generating torque.

As shown in FIG. 1, the high pressure side refrigerant pressure sensor 40A is arranged for detecting the pressure in the refrigerant passage 51a upstream of the valve member 53 so as to detect the pressure of refrigerant before decompressed by the throttle valve 50 in the refrigerating cycle. However, the sensor 40A is not limited to be placed in the refrigerant pipe directly upstream of the throttle valve 50. For example, the sensor 40A may be arranged in the housing 51 so as to face the refrigerant passage 51a upstream of the valve member 53. Further, the discharge pressure sensor 40 may be used in common as the high pressure side refrigerant pressure sensor.

The current value of the constant current drive may be increased based on an increase in a pressure difference between the upstream side and the downstream side of the valve member 53 in the refrigerant passage 51a. Alternatively, the constant current value may be controlled based on sensor information transmitted from three or more sensors.

Although detailed explanation was omitted, the variable throttle valve 26 for cooling may have the same construction as the variable throttle valve 50 for heating. Therefore, the variable throttle valve 26 for cooling and the variable throttle valve 50 for heating can be made common.

The present disclosure is not limited to the above embodiment, and may be practiced with modifications without being deviated from the scope of the present disclosure.

In the above embodiment, when a mode change is performed between the heating mode in which the valve opening is changed within the small flow region lower than or equal to the first predetermined value to decompress and expand the refrigerant, and the dehumidifying heating mode in which the valve opening is changed within the intermediate flow region exceeding the first predetermined value to decompress and expand the refrigerant, the current value of the constant current drive of the motor 55 is increased than the current value used when the valve opening is changed in each of the modes (when the valve opening is changed within a flow range lower than or equal to the first predetermined value and when the valve opening is changed within a flow range exceeding the first predetermined value), but the present disclosure is not limited to this.

For example, when the current value at the heating mode where the valve opening is changed within the flow range lower than or equal to the first predetermined value is different from the current value at the dehumidifying heating mode where the valve opening is changed within the flow range exceeding the first predetermined value, what is necessary is just to increase the current value at the time of mode switch than at least the current value in the heating mode where the flow rate control is performed within the small flow region.

Namely, when a mode change is performed between a first mode in which the valve opening is changed within the small flow region lower than or equal to the first predetermined value to decompress and expand the refrigerant and a second mode in which the valve opening is changed within the intermediate flow region exceeding the first predetermined value to decompress and expand the refrigerant, what is necessary is just to increase the current value of the constant current drive than the current value used for changing the opening degree of the refrigerant passage in the first mode.

Moreover, in the above embodiment, the drive control device prohibits the increase in the current value even at a mode switch time when the time lapsed from the last increase in the current value is shorter (short time) than the predetermined time T such that the temperature of component parts of the drive control device remains high. That is, the lapsed time corresponds to a value of physical quantity related to the temperature of component parts of the drive control device, but the present disclosure is not limited to this.

The increase in the current value may be prohibited even at a mode switch time when other value of physical quantity related to the temperature of component parts of the drive control device, other than the lapsed time, such that the temperature of component parts is higher than a threshold value defined beforehand. Moreover, the temperature of component parts may be directly detected, and the increase in the current value may be prohibited when the detected temperature is higher than a threshold value even at a mode switch time.

Moreover, in the above embodiment, though explanation was omitted about the step drive system of the stepping motor, the stepping motor may has a full step drive or a micro step drive. Moreover, according to required resolution, the full step drive and the micro step drive may be combined with each other.

The full step drive means a drive method in which a tooth (e.g., magnetic pole of the cylindrical magnet 552b) of the rotor 552 is moved from a position opposing a tooth (e.g., magnetic pole magnetized by each phase coil) of the stator 551 to a position opposing a tooth next to of the tooth of the stator 551 by one step. The micro step drive means a drive method in which a tooth of the rotor 552 is moved stepwise from a position opposing a tooth of the stator 551 to a position opposing a tooth next to the tooth of the stator 551 by plural steps. That is, in the micro step drive, the drive angle of the one step of the full step drive is divided into plural steps (such that it is possible to stop the tooth of rotor 552 between two teeth of the stator 551).

Moreover, in the above embodiment, although the variable throttle valve 50 is equipped with the deceleration mechanism 59 which slows down rotation of the stepping motor, and the valve member 53 is displaced by rotation of the stepping motor through the deceleration mechanism 59, the present disclosure is not limited to this. The present disclosure is effective by being applied to an expansion valve device not equipped with a deceleration mechanism.

The motor 55 may be a plural-phase stepping motor other than the two-phase stepping motor. For example, the motor 55 may be a five-phase stepping motor.

The refrigerating cycle 3 may be a vapor compression heat pump cycle in which the high pressure side pressure is equal to or lower than the critical pressure, other than the supercritical vapor compression heat pump cycle.

The variable throttle valve 50 corresponding to the expansion valve device and the drive control device which drives and controls the variable throttle valve 50 may be applied to a stationary type refrigerating cycle other than the refrigerating cycle for the vehicle air-conditioner.

The invention claimed is:

1. An expansion valve device arranged in a refrigerating cycle to decompress and expand refrigerant circulating in the refrigerating cycle, the expansion valve device comprising:

a housing defining a refrigerant passage through which the refrigerant flows;

a valve member arranged in the housing so as to change an opening degree of the refrigerant passage;

an electric driver having a stepping motor to control the opening degree by displacing the valve member in accordance with a rotation angle of the stepping motor; and a drive control device that drives and controls the stepping motor with a constant current, wherein the drive control device performs a flow rate control which controls a flow rate of refrigerant flowing through the refrigerant passage; and the drive control device performs a mode change with the constant current between a first mode in which the opening degree of the refrigerant passage is changed in a first flow region where a flow rate of refrigerant flowing through the refrigerant passage is lower than or equal to a predetermined value and a second mode in which the opening degree of the refrigerant passage is changed in a second flow region where the flow rate of refrigerant flowing through the refrigerant passage is higher than the predetermined value, and increases a value of the constant current at the mode change to be larger than a value of the constant current when the opening degree of the refrigerant passage is changed in the first mode; and the value of the constant current at the mode change in the refrigerating cycle is larger than the value of the constant current at the flow rate control which controls the flow rate of the refrigerant flowing through the refrigerant passage;

the drive control device determines whether there is the mode change in the refrigerating cycle, the drive control device determines whether the number of steps to be performed by the stepping motor is more than or equal to a predetermined value when the drive control device determines that there is no mode change in the refrigerating cycle, the drive control device sets a normal rotation time current value that corresponds to the value of the constant current at the flow rate control when the drive control device determines that the number of steps is less than the predetermined value, the drive control device sets a high rotation time current value which is larger than the normal rotation time current value when the drive control device determines that there is the mode change in the refrigerating cycle, or when the drive control device determines that the number of steps is more than or equal to the predetermined value, and the high rotation time current value corresponds to the value of the constant current at the mode change in the refrigerating cycle.

2. The expansion valve device according to claim 1, further comprising
   a deceleration mechanism which slows down rotation of the stepping motor,
   wherein the valve member is displaced by the rotation of the stepping motor through the deceleration mechanism.

3. The expansion valve device according to claim 1, wherein
   the drive control device prohibits increase in the value of the constant current even at the mode change, when a temperature of the drive control device is higher than a predetermined value, or when a value of physical quantity related to the temperature is higher than a predetermined threshold value.

4. The expansion valve device according to claim 1, wherein
   the first mode is a decompression expansion mode where the refrigerant is decompressed and expanded in the first flow region when the refrigerant flowing through the refrigerant passage is decompressed, and
   the second mode is a full open mode where the valve member makes the opening degree of the refrigerant passage to be maximum such that the flow rate of the refrigerant flowing through the refrigerant passage becomes maximum in the second flow region when the refrigerant flowing through the refrigerant passage is not decompressed.

5. The expansion valve device according to claim 1, wherein
   the first mode is a first decompression expansion mode where the refrigerant is decompressed and expanded in the first flow region,
   the second mode is a second decompression expansion mode where the refrigerant is decompressed and expanded in the second flow region, and
   the drive control device increases the value of the constant current at the mode change to be larger than both of a value of the constant current when the opening degree is changed in the first mode and a value of the constant current when the opening degree is changed in the second mode.

* * * * *